(12) United States Patent
Bolz

(10) Patent No.: US 7,714,586 B2
(45) Date of Patent: May 11, 2010

(54) CONTROL UNIT AND CONTROL DEVICE COMPRISING THE CONTROL UNIT

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 411 days.

(21) Appl. No.: 10/582,449

(22) PCT Filed: Dec. 7, 2004

(86) PCT No.: PCT/EP2004/053317

§ 371 (c)(1),
(2), (4) Date: Jun. 12, 2006

(87) PCT Pub. No.: WO2005/057134

PCT Pub. Date: Jun. 23, 2005

(65) Prior Publication Data

US 2008/0053218 A1  Mar. 6, 2008

(30) Foreign Application Priority Data

Dec. 10, 2003  (DE) .............................. 103 57 771

(51) Int. Cl.
*G01R 31/00* (2006.01)
(52) U.S. Cl. .................. 324/500; 73/290 R; 73/295; 73/304 R
(58) Field of Classification Search .............. 324/500; 73/290 R, 304 R
See application file for complete search history.

(56) References Cited

U.S. PATENT DOCUMENTS

| 4,151,456 A | * | 4/1979 | Black ........................ 323/273 |
| 4,513,616 A |   | 4/1985 | Bezard |
| 4,825,383 A |   | 4/1989 | Ory |
| 6,873,838 B2 | * | 3/2005 | Mapes ....................... 455/336 |
| 6,917,243 B2 | * | 7/2005 | Doherty et al. ............. 330/133 |
| 2002/0084844 A1 | * | 7/2002 | Monroe ....................... 330/51 |
| 2003/0011434 A1 | * | 1/2003 | Luo et al. .................... 330/281 |

FOREIGN PATENT DOCUMENTS

| DE | 31 34 912 | 3/1983 |
| DE | 32 37 396 A1 | 4/1983 |
| DE | 195 26 350 | 1/1997 |
| FR | 2835056 A1 | * 7/2003 |
| WO | WO 91/08441 | 6/1991 |

* cited by examiner

*Primary Examiner*—Timothy J Dole
*Assistant Examiner*—Benjamin M Baldridge
(74) *Attorney, Agent, or Firm*—Laurence A. Greenberg; Werner H. Stemer; Ralph E. Locher

(57) ABSTRACT

A control device includes a control unit and an evaluation unit that is configured to generate a control signal by which the control unit is impinged upon. The control unit is provided with a voltage source and a reference resistor that can be connected in series to a sensor resistor whose value depends on the temperature thereof. An output voltage of the voltage source drops on the sensor resistor and the reference resistor in the connected state. The reference resistor is dimensioned in such a way that the maximum power loss of the sensor resistor lies in the specified value range of the sensor resistor.

11 Claims, 4 Drawing Sheets

CONTROL UNIT AND CONTROL DEVICE COMPRISING THE CONTROL UNIT

BACKGROUND OF THE INVENTION

Field of the Invention

The invention relates to a control unit and a control device comprising the control unit. Such a control unit or such a control device is configured to activate a sensor resistor. They are used in particular to detect the oil level of an internal combustion engine of a motor vehicle.

If a motor vehicle, in which an internal combustion engine is disposed, is not equipped with an oil level sensor, the owner of the vehicle must check at regular intervals whether their vehicle is filled with an adequate quantity of engine oil. An oil level sensor can be used to ensure that the driver does not have to use a dipstick to check the oil level in the motor vehicle at regular intervals, which is on the one hand more user-friendly and on the other hand ensures that the owner of the vehicle is informed when the oil level is too high or too low and can then top up or drain the engine oil accordingly. Motor vehicle manufacturers can protect themselves against unjustified warranty claims based on too low an oil level by registering the measured values of the oil level sensor accordingly.

The sensor element of the oil level sensor can be a wire, which is disposed in an oil pan of the internal combustion engine between two supports such that the oil level can be concluded from the proportion of the total length of the wire that is in the oil. The oil level is then determined by means of an electro-thermal measuring principle.

Depending on the oil level there is oil round a varying length of the wire, the remainder of the wire being in a gaseous medium, preferably air. If a current is passed through the wire, the electrical power in the wire is converted to heat. This heat is given off to the medium surrounding the wire. The electro-thermal measuring principle makes use of the fact that the heat conductivity values of engine oil and air are very different and the electrical resistance of the wire is temperature-dependent. The thermal transfer resistance from wire to oil is significantly lower than from wire to air. This means that the part of the wire in the engine oil is cooled much more efficiently and therefore gives off heat more effectively than the part in air.

With regard to the electro-thermal measuring principle, it is known that a predefined current can be passed through the wire for a predefined time period, causing the wire and its surroundings to be heated. This causes the value of the resistance of the wire to change as a function of the current oil level over the predefined time period. Depending on the voltages, which drop at the measuring wire when the current is first passed and at the end of the predefined time period, it is known that the oil level can be determined from a set of characteristics. The power loss that is converted in the wire during the predefined time period of current passage is highly dependent on the temperature of the wire when the current is first passed and therefore also the ambient temperature. This means that sensitivity is very much a function of ambient temperature.

A mechanism for improving the accuracy of a sensing resistor for an NTC resistor used as a temperature sensor is known from WO 91/08441. It comprises a circuit arrangement with a network of resistors. A computing mechanism influences the network of resistors such that the measuring range for the NTC resistor is displaced. The overall resistance is changed to this end.

SUMMARY OF THE INVENTION

The object of the invention is to create a control unit and a control device comprising the control unit, which are simple and can be adjusted in a precise manner by means of the one power loss in a sensor resistor.

The object is achieved by the features of the independent claims. Advantageous embodiments of the invention are characterized in the subclaims.

In respect of the control unit the invention is characterized by a control unit with a voltage source and a reference resistor, which can be connected in the required manner in series with a sensor resistor, the value of which is a function of its temperature. The control unit is configured such that in the connected state the output voltage of the voltage source drops at the sensor resistor and the reference resistor. The reference resistor is dimensioned such that the maximum power loss of the sensor resistor is in the required value range of the sensor resistor.

As far as the control device is concerned, the invention is characterized by the control device comprising the control unit and an evaluation unit, which is configured to generate a control signal.

Both the claimed control unit and the claimed control device have the advantage that while a voltage is being applied to the sensor resistor by the voltage source, the power loss that is converted in the sensor resistor remains approximately identical within the required value range of the sensor resistor. This means that when the electro-thermal measuring principle is applied, the sensitivity is almost independent of the temperature of the sensor resistor when voltage is first applied to the sensor resistor.

In one advantageous embodiment of the control unit the voltage source is configured to amplify the input voltage. This has the advantage that the output voltage of the voltage source can be greater than its maximum input voltage. It is thus possible to modify the power loss that is converted in the sensor resistor to a high value in a simple manner.

The object is achieved by the features of the independent claims. Advantageous embodiments of the invention are characterized in the subclaims.

In respect of the control unit the invention is characterized by a control unit with a voltage source and a reference resistor, which can be connected in series with a sensor resistor, the value of which is a function of its temperature. The control unit is configured such that in the connected state the output voltage of the voltage source drops at the sensor resistor and the reference resistor. The reference resistor is dimensioned such that the maximum power loss of the sensor resistor is in the required value range of the sensor resistor.

As far as the control device is concerned, the invention is characterized by a control device comprising the control unit and an evaluation unit, which is configured to generate a control signal.

Both the claimed control unit and the claimed control device have the advantage that while a voltage is being applied to the sensor resistor by the voltage source, the power loss that is converted in the sensor resistor remains approximately identical within the required value range of the sensor resistor. This means that when the electro-thermal measuring principle is applied, the sensitivity is almost independent of the temperature of the sensor resistor when voltage is first applied to the sensor resistor.

In one advantageous embodiment of the control unit the voltage source is configured to amplify the input voltage. This has the advantage that the output voltage of the voltage source can be greater than its maximum input voltage. It is thus possible to adjust the power loss that is converted in the sensor resistor to a high value in a simple manner, thereby allowing the sensor resistor to give off a large amount of heat to its surroundings. A change in the sensor resistor can thus be enhanced, thereby increasing the sensitivity of the measurement.

In a further advantageous embodiment of the control unit the voltage source has a limiter for the output voltage. It can thus be ensured in a simple manner that the sensor resistor is not damaged if the voltage source is activated incorrectly. The limiter can be configured as a Zener diode in a particularly simple manner.

In a further advantageous embodiment of the control unit the voltage source comprises three transistors with a common emitter. The first transistor is connected such that its base current is a function of a control signal, which can be applied to the control unit. The base of the second transistor is connected to the collector of the first transistor and the base of the third transistor is connected to the collector of the second transistor. This has the advantage that the voltage source is intrinsically safe. In other words if the voltage source is not activated, the output voltage of the voltage source is zero.

In a further advantageous embodiment of the control unit a low-pass filter is disposed between the first and second transistors of the voltage source. This allows a high direct component to be achieved in the output voltage of the voltage source in a simple manner, even if the input voltage of the voltage source has a high alternating component.

In a further advantageous embodiment of the control unit the low-pass filter is formed by a capacitor, which is connected to the collectors of the first and second transistors, a resistor, which is connected both to the collector of the first transistor and to a voltage supply of the voltage source, and a further resistor, which is connected both to the collector of the second transistor and to the voltage supply of the voltage source. Such a low-pass filter is characterized by its simplicity.

In a further advantageous embodiment of the control unit the reference resistor is connected both to the output of the voltage source and to the sensor resistor. This has the advantage that the voltage source is able to withstand a short circuit when the sensor resistor short circuits to ground.

In a further advantageous embodiment the control unit is configured such that it outputs a variable characterizing the voltage drop at the sensor resistor and the reference resistor at a first output and that it outputs a variable characterizing the potential between the sensor resistor and the reference resistor at a second output. This configuration allows very precise determination of the value of the sensor resistor as errors are eliminated when adjusting the voltage that drops at the sensor resistor and the reference resistor and in the case of an analog-digital conversion of the characterizing variables in the evaluation unit, errors due to fluctuations in the supply voltage of the analog-digital converter(s), which is at the same time the reference voltage of the analog-digital converter(s), are eliminated.

In a further advantageous embodiment of the control unit a voltage divider is provided, to which the voltage drop at the sensor resistor and the reference resistor is applied on the input side and which is connected to the first output on the output side. A reduced voltage is therefore output at the first output, corresponding to the division ratio of the voltage divider. Appropriate dimensioning of the voltage divider allows the converter range of an analog-digital converter to be utilized as fully as possible and it can also be ensured that the voltage present at the first output is not greater than the supply voltage of the analog-digital converter.

In a further advantageous embodiment of the control unit a switch is provided, which is used to control whether the voltage drop at the sensor resistor and the reference resistor is applied to the voltage divider on the input side or a supply voltage of the evaluation unit. If the control device is equipped with such a control unit, the actual voltage divider ratio can be determined precisely by controlling the switch to the position, in which the supply voltage of the evaluation unit is present on the input side of the voltage divider. This means that manufacturing, temperature and age-induced fluctuations in the values of the voltage divider resistors can be compensated for in a simple manner.

In one advantageous embodiment of the control device the evaluation device has a regulator, the regulated variable of which is the voltage drop at the sensor resistor and the reference resistor and the actuating signal of which is the control signal. This means that the output voltage of the voltage source can be adjusted even more accurately. If the evaluation unit is a microcontroller, the control signal can be pulse-width modulated very simply.

Exemplary embodiments of the invention are described below with reference to the schematic drawings, in which:

DESCRIPTION OF THE PREFERRED EMBODIMENTS

Figure 1:
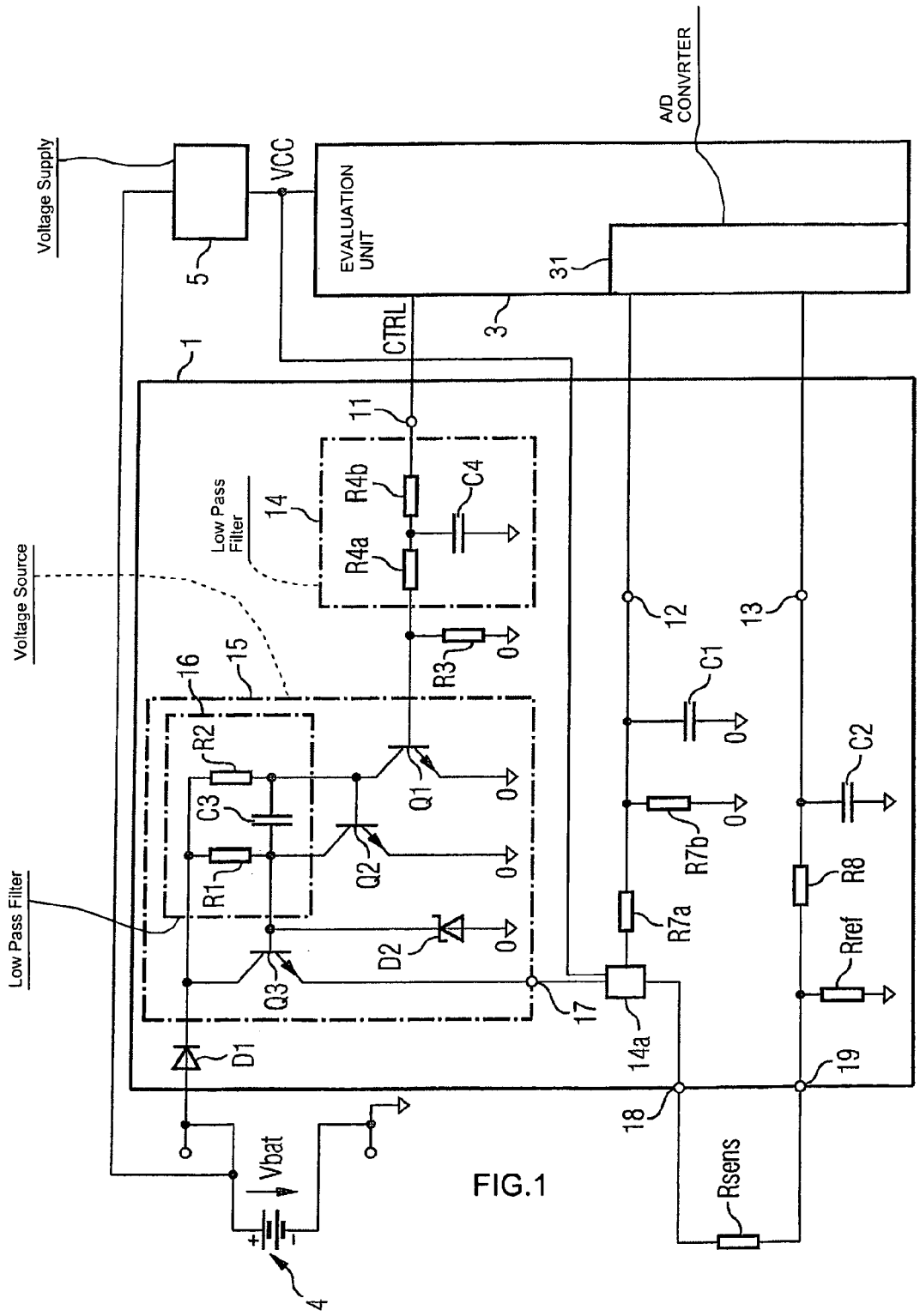
FIG. 1 shows a control device comprising a control unit.

Elements with the same structure and function are marked with the same reference characters in all the figures.

A control device (FIG. 1) comprises a control unit 1 and an evaluation unit 3. It is also assigned a first voltage supply 4, which is preferably the vehicle electrical system voltage supply where the control device is being used for an internal combustion engine of a motor vehicle, said vehicle electrical system voltage supply being supplied by the vehicle battery and a generator. The control device also comprises a second voltage supply 5, which transforms and preferably adjusts the vehicle electrical system voltage Vbat to a supply voltage VCC of the evaluation unit 3. The vehicle electrical system voltage Vbat is generally 12 V, while the supply voltage VCC of the evaluation unit 3 is generally 5 V. The evaluation unit 3 is preferably configured as a microcontroller.

The control unit 1 can be configured separately from the evaluation unit 3 and the second voltage supply 5. It can for example be configured on a chip as an integrated circuit. The control device is preferably part of an engine control device, to which different further measured variables, e.g. an air mass flowing through the intake tract of the internal combustion engine, the position of a gas pedal or even the current air/fuel ratio are received. As a function of these measured variables the engine controller then determines actuating signals for the actuators of the internal combustion engine, which are for example a throttle valve or an injection valve.

The control unit 1 has a control input 11, to which a control signal CTRL can be applied, which is generated in the evaluation unit 3, said control input 11 being connected to the input of a first low-pass filter 14.

The control unit also has a first and second output 12, 13, which are connected to an analog-digital converter 31 of the evaluation unit.

In a simple embodiment the first and second outputs 12, 13 of the control unit 1 are connected via a multiplexer to a single analog-digital converter 31. The outputs are however each preferably connected to their own analog-digital converter 31. This has the advantage that the voltages present at the terminals 12 and 13 can undergo analog-digital conversion at the same time. The analog-digital converter(s) 31 has/have a conversion range, which corresponds to the supply voltage VCC of the evaluation unit 3.

The first low-pass 14 comprises resistors R4a, R4b and a capacitor C4. The first low-pass 14 is connected on the output side to the base of a first transistor Q1 of a voltage source 15. A resistor R3 is also provided, which is connected both on the output side to the low-pass and to the base of the first transistor Q1 and also to ground GND. The resistor R3 causes the first transistor Q1 to remain disconnected when there is no control signal CTRL.

The voltage source 15 comprises the first transistor Q1, a second transistor Q2, a third transistor Q3, a second low-pass filter 16 and a Zener diode D2. The emitter of the first transistor Q1 is connected to ground GND. The collector of the first transistor Q1 is connected both to the base of a second transistor Q2 and to a second low-pass, via which it is connected to the first voltage supply 4 and thus to the vehicle electrical system voltage Vbat.

The emitter of the second transistor Q2 is connected to ground GND and its collector is connected both to the base of a third transistor Q3 and to the second low-pass 16 and via this to the first voltage supply 4 and thus to the vehicle electrical system voltage Vbat.

The anode of the Zener diode D2 is connected to ground GND and its cathode is connected to the base of the third transistor Q3. The collector of the third transistor Q3 is connected to the cathode of a protective diode D1, the anode of which is connected to the first voltage supply 4 and thus to the vehicle electrical system voltage Vbat. The emitter of the third transistor Q3 forms an output 17 of the voltage source 15.

The output 17 of the voltage source 15 is connected both to a first terminal for a sensor resistor Rsens and to a voltage divider on the input side. The voltage divider comprises a resistor 7a and 7b. A capacitor C1 is connected parallel to the resistor 7b. The first output 12 is connected to the connecting line between the resistor R7a and the resistor R7b. The capacitor C1 brings about voltage stabilization at the first output 12. A second terminal 19 for the sensor resistor Rsens is connected to a reference resistor Rref, which is also connected to ground GND. The reference resistor Rref is preferably a so-called shunt resistor. Such shunt resistors have relatively low ohmic values of 0.001Ω up to around 100Ω and a high current carrying capacity of 1 mA up to 100 A.

The second terminal 19 is also connected to a resistor R8, which is connected to the second output 13 of the control unit 1 and to a capacitor C2, which in turn is connected to ground GND. The resistor R8 is configured to be high-resistance and preferably has a value from 3 to 8 kΩ. The capacitor C2 is used for voltage stabilization at the second output 13.

The sensor resistor Rsens is preferably a resistance wire, which is disposed vertically in an oil pan of the internal combustion engine. That is to say the resistance wire is disposed in the oil pan such that the proportion of the resistance wire in the oil is a measure of the oil level of the internal combustion engine. During the required operation of the control device the sensor resistor Rsens is connected to the first and second terminals 18, 19.

If there is a high potential present at the base of the first transistor Q1, for example the supply voltage VCC of the evaluation unit 3 minus a corresponding voltage drop at the resistors R4a and R4b, the first transistor Q3 is at saturation, that is to say ground GND is almost present at its collector. Almost the entire vehicle electrical system voltage Vbat then drops at the resistor R2. The second transistor Q2 is correspondingly blocked. In the stationary state the vehicle electrical system voltage Vbat is present at the collector of the second transistor or, if the vehicle electrical system voltage Vbat is greater than the breakdown voltage of the Zener diode D2, the breakdown voltage of the Zener diode D2 is present at the collector of the second transistor Q2. Therefore the vehicle electrical system voltage Vbat or the breakdown voltage of the Zener diode D2 is also present at the base of the third transistor Q3. In this instance the vehicle electrical system voltage Vbat minus the base emitter voltage of the third transistor Q3 or the breakdown voltage of the Zener diode D2 also minus the base emitter voltage of the third transistor Q3 is present at the output 17 of the voltage source 15.

The Zener diode D2 ensures that the output voltage of the voltage source 15 does not exceed the breakdown voltage of the Zener diode D2 minus the base emitter voltage of the third transistor. By defining the breakdown voltage of the Zener diode D2 correspondingly it is thus possible to adjust the maximum output voltage present at the output 17 of the voltage source 15. This ensures in a simple manner that circuit elements connected downstream are not damaged in the event of a fault.

The diode D1 protects the voltage source 15 against polarity reversal of the first voltage supply 4.

If however the control signal CTRL has a low level, for example that of ground GND, the first transistor Q1 also blocks in stationary mode, with the result that the base of the second transistor Q2 receives approximately all the current flowing through the resistor R2, as a result of which the second transistor Q2 is conductive and at saturation. This in turn means that the third transistor Q3 blocks. In this instance ground GND is present as potential at the output 17 of the voltage source 15.

If however a voltage passed via the resistors R4a, R4b is present at the base of the first transistor Q1, the potential of said voltage being between the two extremes described above, the transistor Q1 is operated in proportional mode and the transistor Q2 is also operated in proportional mode in reverse proportion to the transistor Q1. The third transistor Q3 is operated in proportional mode. Its emitter voltage follows the collector voltage of the second transistor Q2 minus its base emitter voltage. The output voltage at the output 17 of the voltage source 15 can in this instance thus be varied continuously and thus adjusted.

A second low-pass 16 smooths the base voltage of the third transistor Q3, thereby reducing the alternating component of the output voltage, which is present at the output 17 of the voltage source 15.

If an additional resistor (not shown) is provided, which is both connected to the base of the third transistor Q3 and is also connected to the cathode of the Zener diode and the collector of the second transistor Q2, it can be ensured by dimensioning said resistor appropriately that the third transistor Q3 is not damaged in the event of a short circuit at the output 17 of the voltage source 15. Alternatively the protective diode D1 can also be disposed between the emitter of the third transistor Q3 and the output 17 of the voltage source 15.

The transistors Q1 to Q3 of the voltage source 15 are preferably integrated monolithically. This results in a particularly appropriate set of characteristics for the transistors Q1, Q2, Q3 and more even temperature distribution in the transistors Q1 to Q3.

Figure 2:
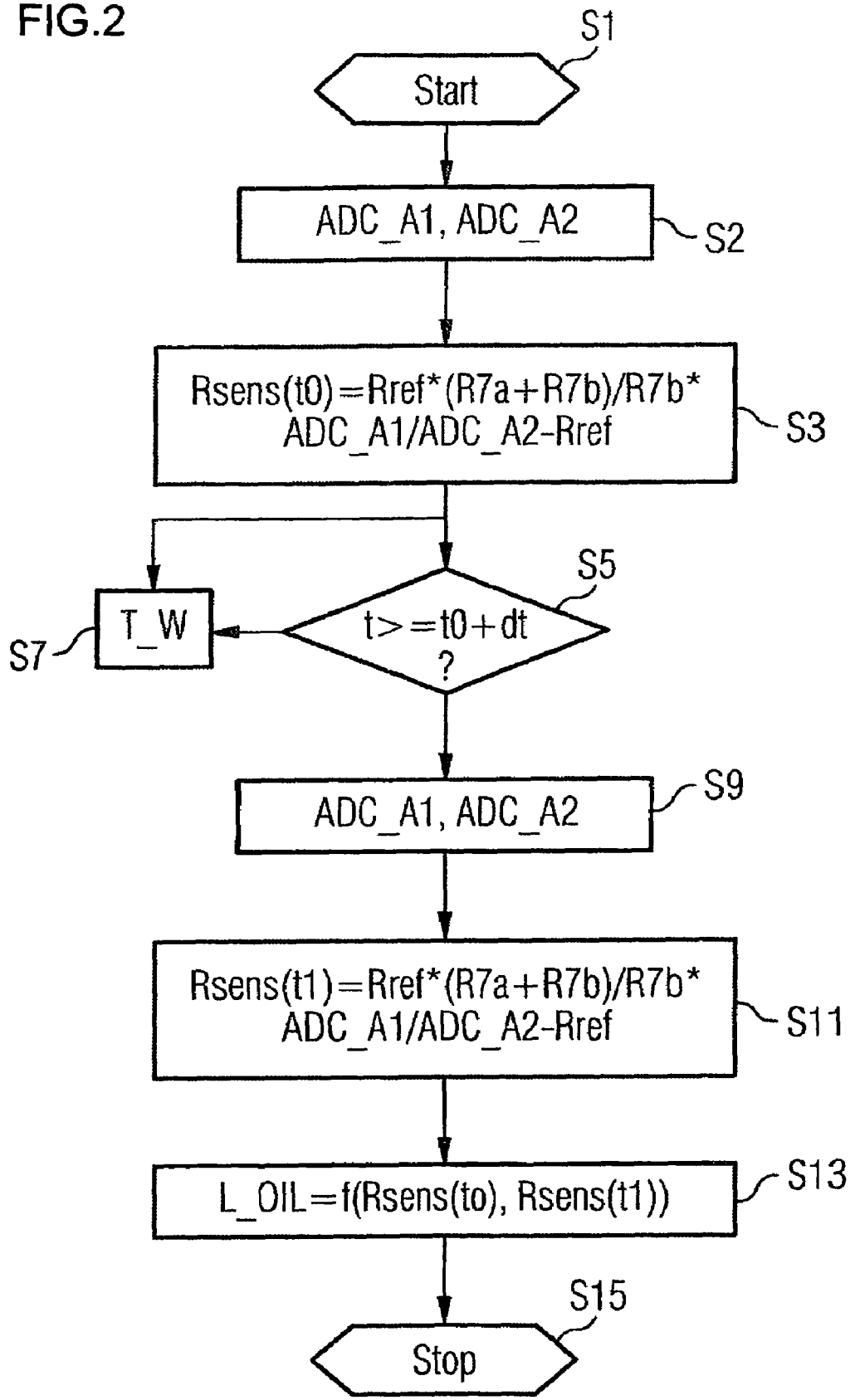
FIG. 2 shows a flow diagram of a program for determining an oil level.

A program (FIG. 2) for determining an oil level L_OIL of the engine oil in the internal combustion engine is started in a step S1. It preferably starts at approximately the same time as the internal combustion engine, as the oil is distributed in the internal combustion engine and its level in the oil pan sinks as time continues to pass after the start time. An informative oil level measurement is therefore simply effected very close to the time when the internal combustion engine starts up.

Figure 3:
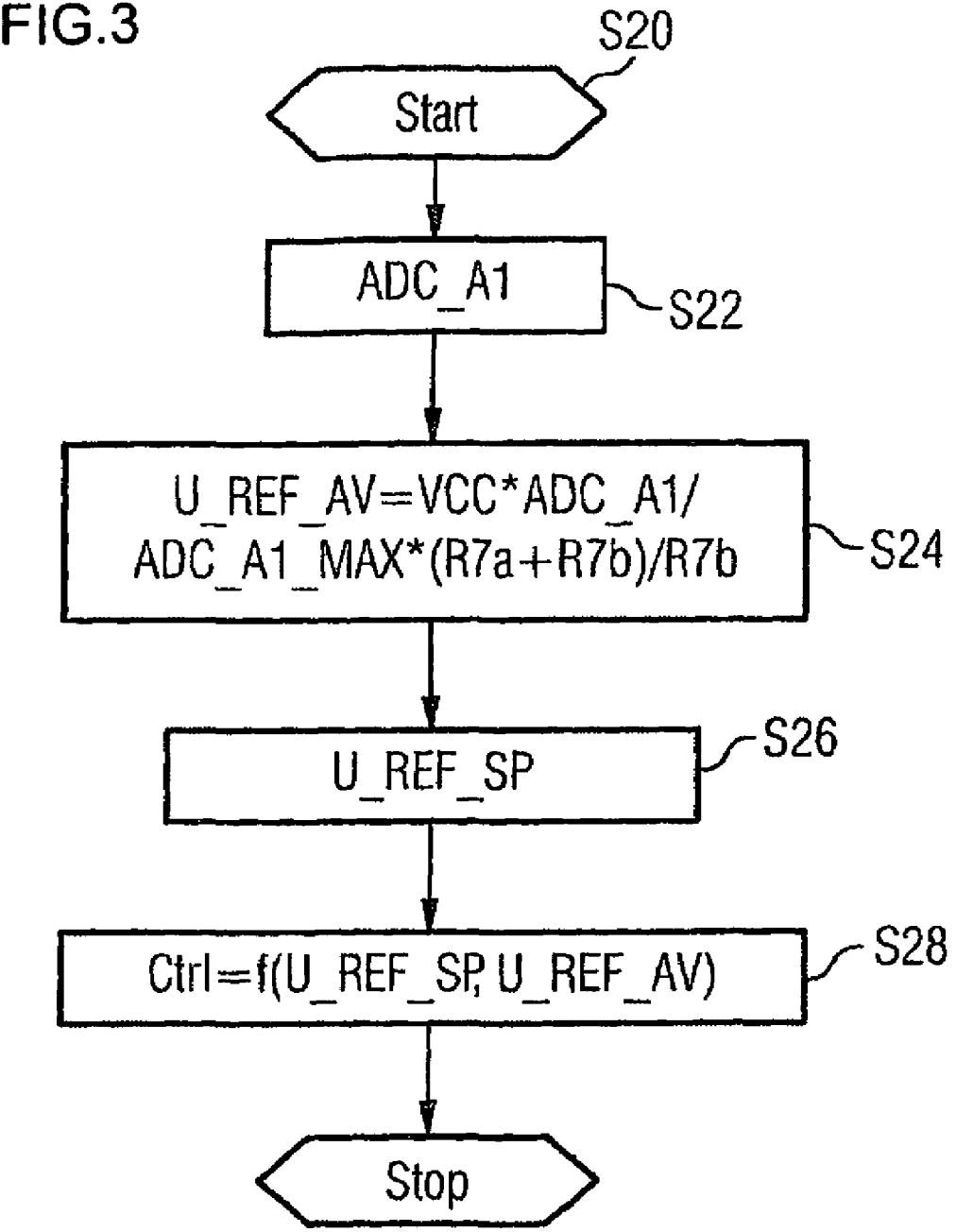
FIG. 3 shows a flow diagram of a program providing a regulator.

Also—starting in step S1—a control signal CTRL is generated for a predefined time period, e.g. 600 ms. The subsequent steps of the program are processed parallel to the generation of the control signal CTRL. The control signal CTRL is preferably generated by means of a regulator, which is described in more detail below with reference to the flow diagram in FIG. 3. The control signal CTRL is preferably pulse-width modulated. In a simple embodiment of the control device however the regulator can be omitted and the control signal CTRL need only be output for the predefined time period with a voltage level of the supply voltage VCC of the evaluation unit 3. In this instance the resistors R4a, R4b and R3 must then be correspondingly dimensioned, such that the required voltage is present at the base of the first transistor Q1.

The output voltage present at the output 17 of the voltage source is preferably between 6 and 8 volts maximum.

In a step S2 the analog-digital converter(s) 31 is/are used to determine digital values ADC_A1, ADC_A2 of the voltages present at the first and second outputs 12, 13. Almost the entire converter range of the analog-digital converter(s) 31 can be utilized in conjunction with appropriate dimensioning of the resistors R7a and R7b of the voltage divider and the reference resistor Rref.

In a step S3 the value of the sensor resistor Rsens at time t0 is then determined as a function of the value of the reference resistor Rref, the resistors R7a and R7b and the digital values ADC_A1, ADC_A2 of the voltages at the first and second output 12, 13. By determining the value of the resistor Rsens as a function of the relationship of the digital values ADC_A1 and ADC_A2 of the voltages at the first and second output 12, 13, fluctuations of the supply voltage VCC of the evaluation unit 3 do not affect the value of the sensor resistor Rsens.

The program is then continued in a step S5, in which it is verified whether the current time t is greater than or equal to the time t0 plus a predefined delay time period dt. If the condition of step S5 is not satisfied, the program remains at step S7 for a predefined waiting time period T_W, which is shorter than the delay time period dt. If however the condition of step S5 is satisfied, the program branches to a step S9. The delay time period dt and the waiting time period T_W are preferably selected such that the step S9 is processed in a time t1 which is delayed by the predefined time period for the presence of the second control signal CTRL2 at time t0. This time period is approximately 600 ms.

In step S9 the analog-digital converter(s) 31 is/are used again to determine the digital values ADC_A1 and ADC_A2 of the voltages at the first output 12 and the second output 13. The time sequences of the steps S5, S7 and S9 are selected such that the control signal CTRL is still being generated at the time when step S9 is being processed.

In a step S11 the value of the sensor resistor at time t1 is determined from the digital values ACD_A1 and ADC_A2 determined in step S9, the reference resistor Rref and the values of the resistors R7a and R7b.

In a subsequent step S13 the oil level L_OIL is determined as a function of the values of the sensor resistor Rsens at times t0 and t1 as determined in steps S3 and S11. This is preferably done using a set of characteristics, which was determined previously by means of corresponding tests and measurements. The program is then terminated in a step S15.

The evaluation unit 3 preferably also comprises a regulator, which is deployed in the form of a program. The program is stored in the evaluation unit 3 and downloaded for the operation of the evaluation unit 3 and processed at regular intervals. The program is preferably processed parallel to the processing of steps S1 to S9 according to the program in FIG. 2.

In a step S20 (FIG. 3) the program is started and variables are optionally initialized. In a step S22 the digital value ADC_A1 of the voltage at the first output 12 is determined.

In a step S24 an actual value U_REF_AV of the voltage, which drops at the reference resistor Rref and the sensor resistor Rsens, is determined as a function of the digital value ADC_A1, the maximum value ADC_A1_MAX of the digital value ADC_A1 of the supply voltage VCC of the evaluation unit 4 and the reverse voltage divider ratio of the voltage divider.

In a step S26 a target value U_REF_SP is determined of the voltage, which drops over the sensor resistor Rsens and the reference resistor Rref.

In a step S28 the control signal is generated as a function of the determined target value and actual value of the voltage drop at the sensor resistor Rsens and the reference resistor Rref. The control signal CTRL is preferably pulse-width modulated, the pulse width being a function of the difference between the target value U_REF_SP and the actual value U_REF_AV. It is possible in this manner to regulate the output voltage very precisely at the output 17 of the voltage source 15.

Figure 4:
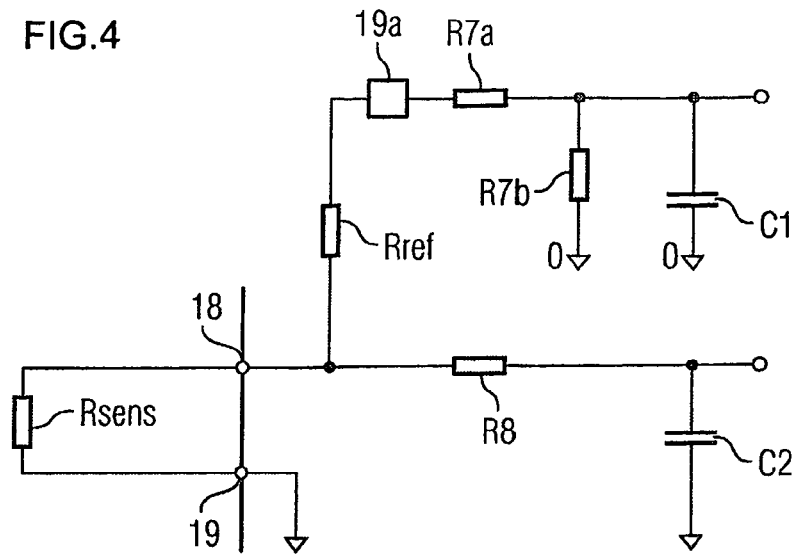
FIG. 4 shows a further embodiment of the control device.

In an alternative embodiment of the control device (FIG. 4) the reference resistor Rref is connected both to the output 17 of the voltage source 15 and to the first terminal 18 for the sensor resistor Rsens. The second terminal 19 for the sensor resistor Rsens is connected directly to ground GND. This circuit arrangement has the advantage compared with the one in FIG. 1 that due to the arrangement of the reference resistor Rref it is resistant to short circuits when the sensor resistor Rsens short circuits to ground GND. With this embodiment of the control device it is therefore possible optionally to omit the resistor between the cathode of the Zener diode D2 and the base of the third transistor Q3.

Figure 5:
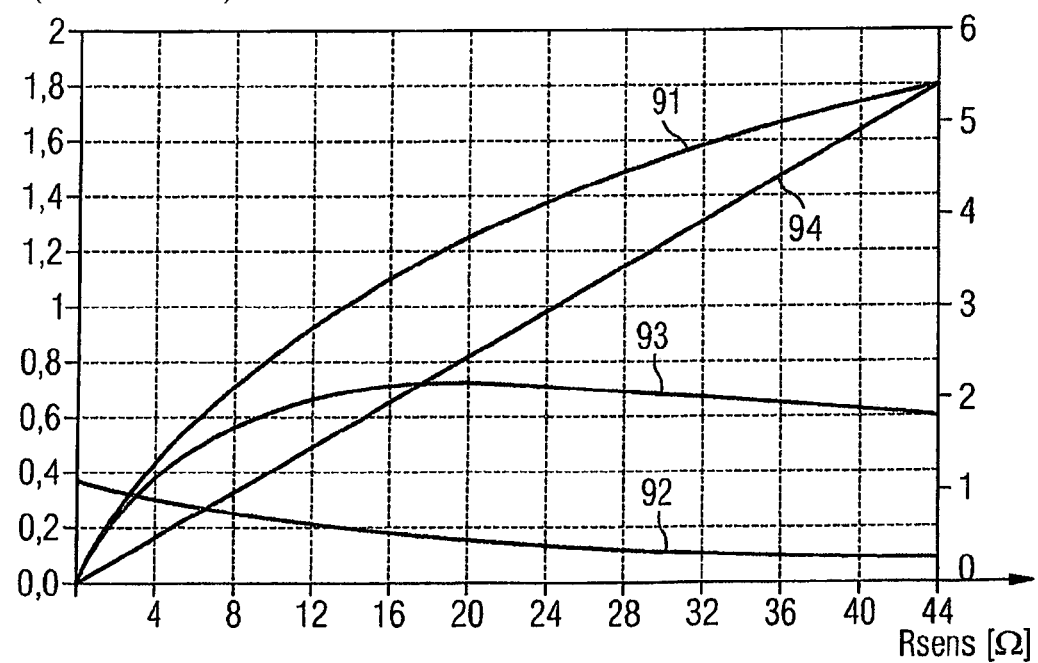
FIG. 5 shows the pattern of different variables over values of the sensor resistor Rsens.

FIG. 5 shows patterns of different variables over the value range of the sensor resistor Rsens in the event that the output voltage at the output 17 of the voltage source 15 is 6 volts and the reference resistor has a value of 10Ω. The required value range of the sensor resistor Rsens is thereby between 17 and 37Ω for example. A curve 91 represents the pattern of the voltage drop at the sensor resistor Rsens. A curve 92 represents the current through the sensor resistor Rsens. A curve 93 represents the power loss in the sensor resistor Rsens. By comparison a curve 94 shows the power loss in the sensor resistor Rsens, when there is a constant current regulator present instead of the voltage regulator. The curve 91 is scaled in respect of the right ordinates. The curves 92, 93 and 94 are scaled in respect of the left ordinates.

It can be seen from the curve 93 of the power loss in the sensor resistor Rsens that its maximum is within the required value range of the sensor resistor Rsens and that the pattern of the curve in this range is extremely flat, almost horizontal. The power loss in the sensor resistor is thus almost constant in the required value range of the sensor resistor Rsens. This means that irrespective of the temperature of the sensor resistor Rsens at the start of the application of voltage to the sensor resistor Rsens, an approximately identical heat is converted in the sensor resistor Rsens within the predefined time period. The sensitivity of the oil level measurement is therefore almost independent of the start temperature.

The voltage divider, formed by the resistors R7a and R7b, is preferably connected on the input side to a switch 19a, which connects the voltage divider as a function of its switch position either to the first terminal 17 of the sensor resistor Rsens or to the second voltage supply 5 and therefore the supply voltage VCC of the evaluation unit 3. Thus by corresponding detection of the digital value ADC_A1 of the voltage at the first output 12, when the switch 19 connects the input of the voltage divider to the second voltage supply 5, it is possible to determine the actual voltage divider ratio of the resistors R7a and R7b and take it into account when determining the value of the sensor resistor Rsens in steps S3 and S11 of the program according to FIG. 2. It is thus possible to increase the accuracy of the determination of the value of the sensor resistor Rsens in steps S3 and S11 further in this manner.

The accuracy of the determination of the value of the sensor resistor Rsens can also be further increased by measuring the reference resistor Rref individually when producing the control device and storing the value of the reference resistor thus determined in the evaluation unit 3.

The sensor resistor Rsens is preferably configured as a resistance wire but it can also be in the form of any other resistor, to which a power that has to be adjusted precisely is to be fed. The transistors can also be field effect transistors, in particular MOS-FET transistors.

It is possible to identify an error using the digital value(s) ADC_A1, ADC_A2 by means of plausibilization and to adjust the control signal CTRL such that a predefined potential, preferably ground, is present at the output 17 of the voltage source 15.

I claim:

1. A control unit for sensing an oil level of an engine of a motor vehicle, comprising:
    a voltage source having an output outputting an output voltage;
    a sensor resistor having a value being dependent on its temperature, wherein said sensor resistor senses the oil level of the engine of the motor vehicle substantially independently of an initial temperature of said sensor resistor; and
    a reference resistor connected in series with said sensor resistor, the output voltage of said voltage source dropping across said sensor resistor and said reference resistor in a connected state, said reference resistor being dimensioned such that a power loss of said sensor resistor is substantially constant for a range of resistance values of said sensor resistor; and
    an evaluation unit generating a control signal and connected to said control unit, said evaluation unit having a regulator, said regulator controlling a regulated variable being a voltage drop over said sensor resistor and said reference resistor, and outputting an actuating signal, said actuating signal being the control signal.

2. The control unit according to claim 1, wherein said voltage source amplifies an input voltage.

3. The control unit according to claim 2, wherein said voltage source has a limiter for limiting the output voltage.

4. The control unit according to claim 3, wherein said limiter is a Zener diode.

5. The control unit according to claim 1, wherein said voltage source includes first, second and third transistors with a common emitter and each having a base and a collector, a base current of said first transistor being a dependent on a control signal applied to the control unit, said base of said second transistor connected to said collector of said first transistor, and said base of said third transistor is connected to said collector of said second transistor.

6. The control unit according to claim 5, wherein said voltage source has a low-pass filter disposed between said first and second transistors.

7. The control unit according to claim 6, further comprising a voltage supply connected to said voltage source;
    wherein said low-pass filter includes:
        a capacitor connected to said collectors of said first and second transistors and also to said voltage supply;
        a resistor connected both to said collector of said first transistor and also to said voltage supply;
        a further resistor connected both to said collector of said second transistor and also to said voltage supply.

8. The control unit according to claim 1, wherein said reference resistor is connected both to said output of said voltage source and to said sensor resistor.

9. The control unit according to claim 1, further comprising:
    a first output, the control unit outputting a variable characterizing a voltage drop by said sensor resistor and said reference resistor at said first output; and
    a second output, the control unit outputting a variable characterizing a potential between said sensor resistor and said reference resistor at said second output.

10. The control unit according to claim 9, further comprising a voltage divider having an input side receiving the voltage drop over said sensor resistor and said reference resistor, said voltage divider having an output side connected to said first output.

11. The control unit according to claim 10, further comprising a switch, said switch being used to control whether the voltage drop at said sensor resistor and said reference resistor is applied to said voltage divider on said input side or a supply voltage of an evaluation unit.

* * * * *